United States Patent
Fukawatase et al.

(10) Patent No.: US 9,376,040 B2
(45) Date of Patent: Jun. 28, 2016

(54) VEHICULAR SEAT

(75) Inventors: Osamu Fukawatase, Miyoshi (JP); Aya Yamamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 14/360,466

(22) PCT Filed: Dec. 20, 2011

(86) PCT No.: PCT/JP2011/079550
§ 371 (c)(1),
(2), (4) Date: May 23, 2014

(87) PCT Pub. No.: WO2013/094027
PCT Pub. Date: Jun. 27, 2013

(65) Prior Publication Data
US 2014/0346819 A1 Nov. 27, 2014

(51) Int. Cl.
*B60N 2/427* (2006.01)
*B60N 2/42* (2006.01)
*B60N 2/56* (2006.01)
*B60R 21/207* (2006.01)

(52) U.S. Cl.
CPC .......... *B60N 2/42718* (2013.01); *B60N 2/4221* (2013.01); *B60N 2/5657* (2013.01); *B60R 21/207* (2013.01)

(58) Field of Classification Search
CPC ............. B60N 2/42718; B60N 2/5657; B60N 2/4221; B60R 21/207
See application file for complete search history.

(56) References Cited

U.S. PATENT DOCUMENTS

| 5,439,247 A | 8/1995 | Kolb |
| 6,062,641 A | 5/2000 | Suzuki et al. |
| 6,467,563 B1 * | 10/2002 | Ryan .................. B60R 21/36 180/274 |
| 7,080,880 B2 * | 7/2006 | Acker .................. B60N 2/4415 280/730.1 |
| 7,527,333 B2 * | 5/2009 | Suzuki ............... B60N 2/42718 280/728.2 |
| 8,641,086 B2 * | 2/2014 | Hashido ............. B60N 2/42718 280/730.1 |

(Continued)

FOREIGN PATENT DOCUMENTS

| DE | 19605620 A1 | 8/1997 |
| EP | 1 380 475 A1 | 1/2004 |

(Continued)

OTHER PUBLICATIONS

Feb. 10, 2015 Extended European Search Report issued in European Application No. 11878283.8.

*Primary Examiner* — Paul N Dickson
*Assistant Examiner* — Joselynn Y Sliteris
(74) *Attorney, Agent, or Firm* — Oliff PLC (57) ABSTRACT

To obtain a vehicular seat with which the expansion and deployment of expanding portions can be completed in a short amount of time. A vehicular seat has: a seat cushion; a first expanding portion that is provided in the seat cushion on one side thereof with respect to a seat width direction center and which, upon receiving a supply of gas, is expanded and deployed; a second expanding portion that is provided in the seat cushion on the other side thereof with respect to the seat width direction center and which, upon receiving a supply of gas, is expanded and deployed in such a way as to oppose the first expanding portion across a central space portion in the seat width direction; and gas supplying device which, when actuated at the time of a frontal impact of the vehicle, supplies gas to the first expanding portion and second expanding portion.

12 Claims, 10 Drawing Sheets

(56) References Cited

U.S. PATENT DOCUMENTS

| | | | |
|---|---|---|---|
| 8,662,238 B2* | 3/2014 | Ivenz | B60R 21/36 180/271 |
| 2001/0011810 A1 | 8/2001 | Saiguchi et al. | |
| 2004/0007905 A1 | 1/2004 | Acker et al. | |
| 2004/0155436 A1 | 8/2004 | Saiguchi et al. | |
| 2004/0155446 A1 | 8/2004 | Saiguchi et al. | |
| 2007/0246919 A1 | 10/2007 | Kai | |

FOREIGN PATENT DOCUMENTS

| | | |
|---|---|---|
| EP | 1 905 659 A1 | 4/2008 |
| JP | Y-47-21783 | 7/1972 |
| JP | U-61-159248 | 10/1986 |
| JP | A-06-191365 | 7/1994 |
| JP | A-11-137371 | 5/1999 |
| JP | A-2001-247010 | 9/2001 |
| JP | A-2002-079862 | 3/2002 |
| JP | A-2006-282087 | 10/2006 |
| JP | A-2007-176454 | 7/2007 |
| JP | A-2007-283956 | 11/2007 |
| JP | A-2010-052535 | 3/2010 |
| JP | A-2010-095064 | 4/2010 |
| WO | 2010/036626 A1 | 4/2010 |

* cited by examiner

VEHICULAR SEAT

TECHNICAL FIELD

The present invention relates to a vehicular seat in which an airbag is provided in a seat cushion.

BACKGROUND ART

There is known a configuration wherein a substantially rectangular airbag in which both corner portions on the rear side are rounded as seen in plan view is disposed in a seat cushion (e.g., see Japanese Patent Application Laid-Open (JP-A) No. 2010-95064).

DISCLOSURE OF INVENTION

Technical Problem

Incidentally, there is a demand to stop as soon as possible the forward movement of an occupant seated in a vehicular seat at the time of a frontal impact, and in the above-described technology there is room for improvement in this respect.

It is an object of the present invention to obtain a vehicular seat with which the expansion and deployment of expanding portions can be completed in a short amount of time.

Solution to Problem

A vehicular seat relating to a first aspect of the present invention comprises: a seat cushion; a first expanding portion that is provided in the seat cushion on one side thereof with respect to a seat width direction center and which, upon receiving a supply of gas, is expanded and deployed; a second expanding portion that is provided in the seat cushion on the other side thereof with respect to the seat width direction center and which, upon receiving a supply of gas, is expanded and deployed in such a way as to oppose the first expanding portion across a central space portion in the seat width direction; and gas supplying device which, when actuated at the time of a frontal impact of the vehicle, supplies gas to the first expanding portion and the second expanding portion.

According to the above aspect, the gas supplying device is actuated in a case where (the inevitability of) a frontal impact of the vehicle has been detected. Then, because of the supply of gas from the gas supplying device, the first and second expanding portions are expanded and deployed. Because of this, both thighs of a seated occupant are raised and forward movement of the occupant is suppressed. Here, the central space portion is formed between the first and second expanding portions, so compared to a configuration having a rectangular or circular expanding portion along the seat width direction center, in this aspect, the total capacity of the expanding portions is smaller. For this reason, the expansion and deployment of the first and second expanding portions by the supply of gas from the gas supplying device is completed in a short amount of time.

In this way, with the vehicular seat relating to the above aspect, the expansion and deployment of the expanding portions can be completed in a short amount of time.

In the above aspect, a configuration may be provided, wherein the vehicular seat further comprises a third expanding portion that communicates the first expanding portion and the second expanding portion with one another.

According to the above aspect, the first and second expanding portions are communicated with one another via the third expanding portion, so an airbag including the first and second expanding portions that have the function of raising both thighs of the seated occupant can be handled as a single bag.

In the above aspect, a configuration may be provided, wherein the first to third expanding portions configure a U-shaped airbag that opens rearward in a seat front and rear direction as seen in plan view and surrounds the central space portion.

According to the above aspect, the airbag has a U-shape overall as seen in plan view, so the function of raising both thighs of the seated occupant can be fulfilled with a U-shaped airbag having a simple shape and a small capacity.

In the above aspect, a configuration may be provided, wherein the first to third expanding portions configure part of an annular airbag having an annular shape that surrounds the central space portion as seen in plan view.

According to the above aspect, the airbag has an annular shape overall as seen in plan view, so the function of raising both thighs of the seated occupant can be fulfilled with an annular airbag having a simple shape and a small capacity.

In the above aspect, a configuration may be provided, wherein the gas supplying device is disposed in the third expanding portion and fix the third expanding portion to the seat cushion.

According to the above aspect, the gas supplying device is disposed in the third expanding portion that communicates the first and second expanding portions with one another, so the gas supplying device is shared in common by the expanding portions. Furthermore, positional displacement of the airbag with respect to the seat cushion is limited by the gas supplying device.

In the above aspect, a configuration may be provided, wherein the vehicular seat further comprises a joint cloth that is provided in the seat cushion in such a way as to cover the central space portion and is joined to the first to third expanding portions.

According to the above aspect, the expanding portions are suppressed by the (tension of the) joint cloth from moving away from one another when the occupant is protected (restrained) by the expanding portions in a frontal impact. That is, the expanding portions are reinforced by the joint cloth. In particular, forward collapse of the expanding portions caused by the inertia of the occupant and an increase in the amount of forward movement of the occupant caused thereby are suppressed.

In the above aspect, a configuration may be provided, wherein the vehicular seat further comprises a duct that is disposed facing the central space portion, configures at least part of seat cooling device, and blows out air in the seat cushion, and the joint cloth may have an air-permeable configuration.

According to the above aspect, with respect to the seat cushion of the vehicular seat to which the seat cooling device has been applied, an airbag can be disposed while ensuring air blowing from the seat cooling device and a reinforcement effect resulting from the joint cloth.

In the above aspect, a configuration may be provided, wherein the vehicular seat further comprises a duct that is disposed facing the central space portion, configures at least part of seat cooling device, and blows out air in the seat cushion.

According to the above aspect, with respect to the seat cushion of the vehicular seat to which the seat cooling device has been applied, an airbag can be disposed while ensuring air blowing from the seat cooling device.

Advantageous Effects of Invention

As described above, the vehicular seat relating to the present invention has the superior effect that the expansion and deployment of expanding portions can be completed in a short amount of time.

BEST MODES FOR CARRYING OUT THE INVENTION

A vehicular seat 10 relating to a first embodiment of the present invention will be described on the basis of FIG. 1 to FIG. 6. Arrow FR appropriately indicated in the drawings denotes a front direction in a vehicle front and rear direction, arrow UP denotes an up direction in a vehicle up and down direction, and arrow RH and arrow LH denote a right side (one side in a seat width direction) and a left side (the other side in the seat width direction), respectively, as seen from the perspective of an occupant P seated in the vehicular seat 10. In the following description, in the case of using the directions of front and rear, up and down, and right and left without special note, these will denote front and rear in the vehicle front and rear direction, up and down in the vehicle up and down direction, and right and left as seen from the perspective of the seated occupant P. The seat width direction and the vehicle width direction coincide with the right and left direction as seen from the perspective of the seated occupant P.

Figure 1:
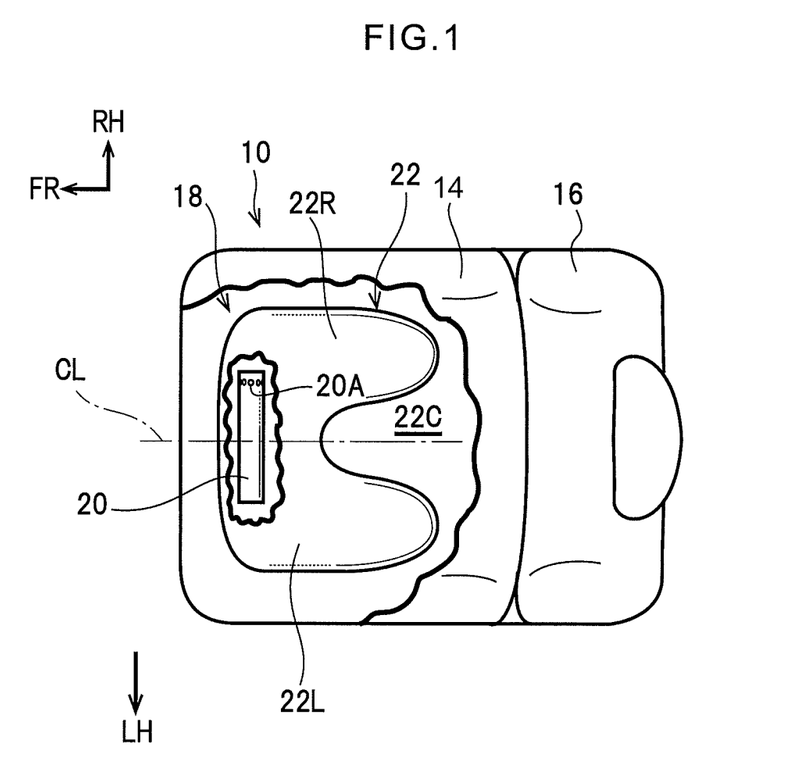
FIG. 1 is a partial cutaway plan view showing a vehicular seat relating to a first embodiment of the present invention.

In FIG. 1, the schematic overall configuration of the vehicular seat 10 is shown by way of a partial cutaway plan view. As shown in this drawing, the vehicular seat 10 is configured to comprise a seat cushion 14 on which the occupant sits and a seat back 16 whose lower end side is connected to the rear end side of the seat cushion and which forms a back rest. Additionally, a cushion airbag device 18 is disposed in the seat cushion 14. The cushion airbag device 18 takes as its main components and is configured by an inflator 20 serving as gas supplying device and a cushion airbag 22 serving as an airbag that expands and deploys upon receiving a supply of gas from the inflator 20.

Figure 3:
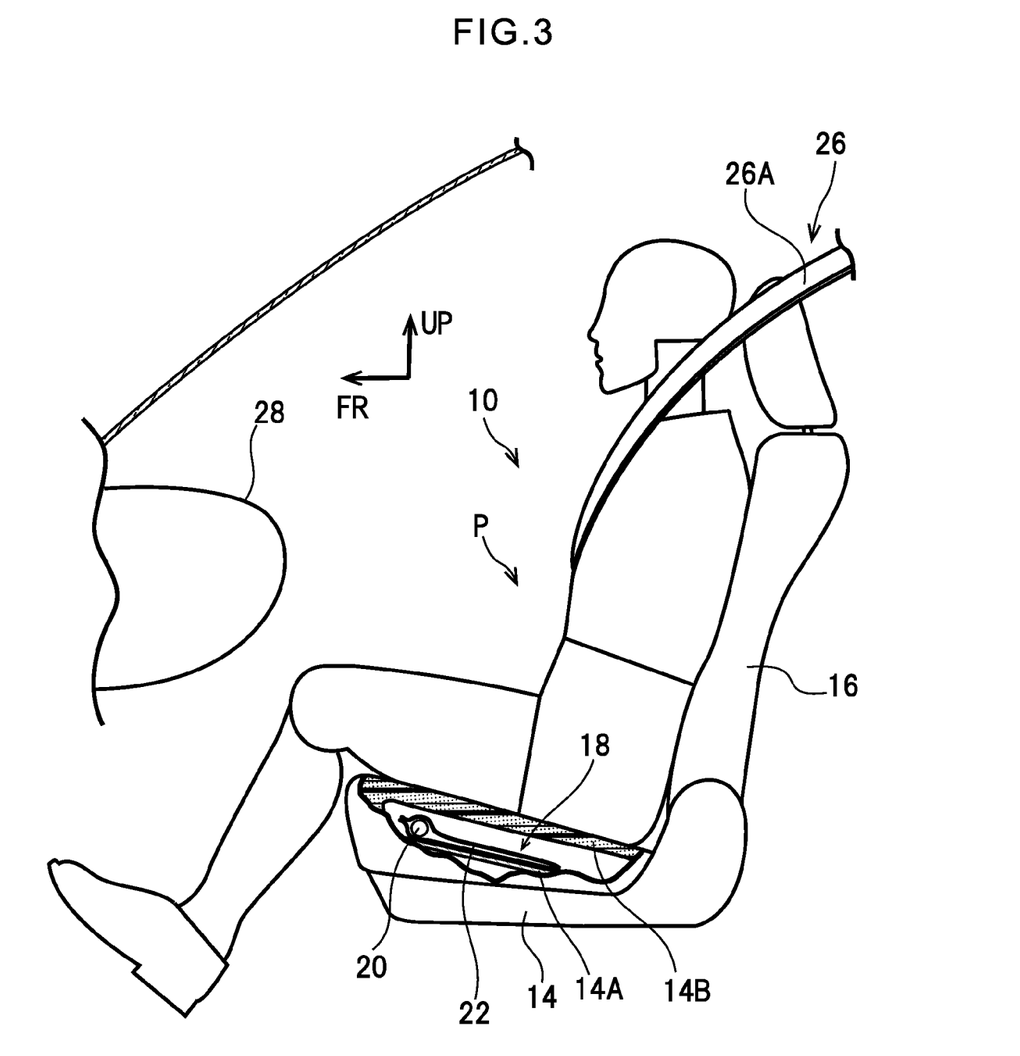
FIG. 3 is a partial cutaway side view showing a normal seated state of an occupant in the vehicular seat relating to the first embodiment of the present invention.
Figure 4:
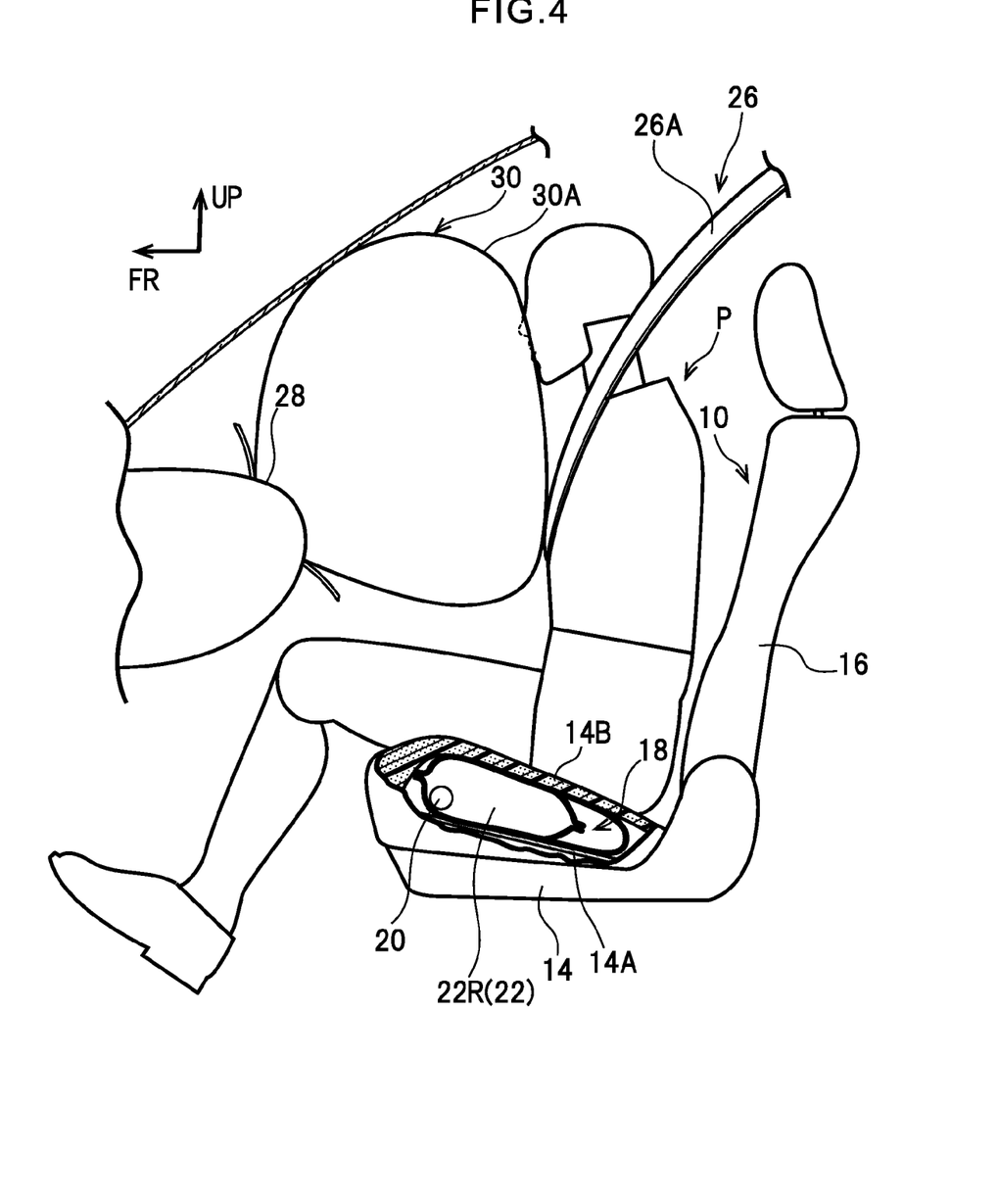
FIG. 4 is a partial cutaway side view showing the deployed state of the cushion airbag in the vehicular seat relating to the first embodiment of the present invention.

As shown in FIG. 3, mechanical components of the cushion airbag device 18 are disposed between a seat pan 14A and a cushion material 14B which configure the seat cushion 14. As shown in FIG. 4, the cushion airbag device 18 has a configuration wherein it raises the thighs of the seated occupant P upward when the cushion airbag 22 is expanded and deployed. Consequently, when the cushion airbag device 18 is actuated at the time of a frontal impact of the vehicle, the thighs of the seated occupant P are raised, whereby movement of the seated occupant P toward the front of the vehicle caused by inertia is suppressed (regulated).

Figure 2:
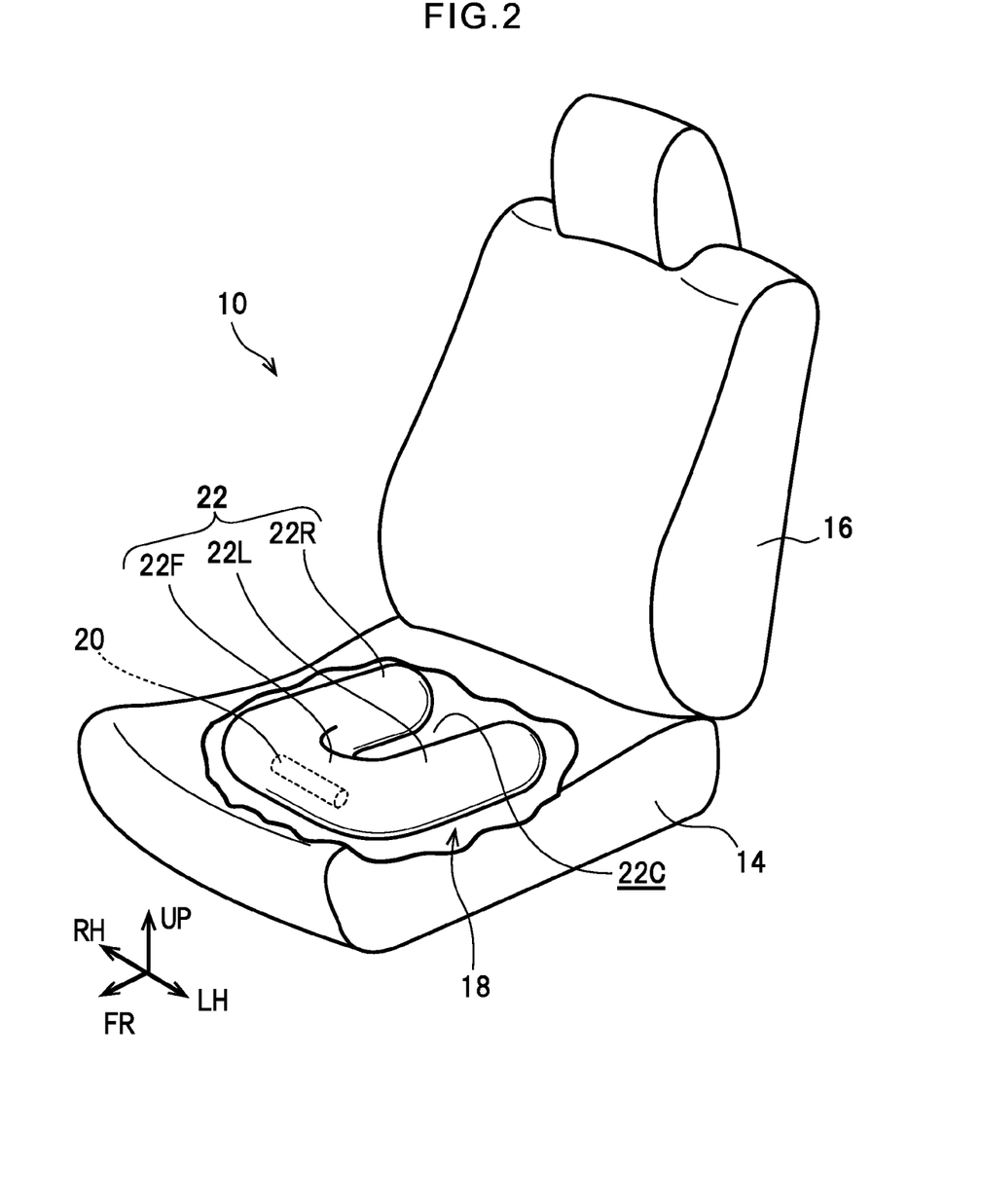
FIG. 2 is a partial cutaway perspective view showing a deployed state of a cushion airbag in the vehicular seat relating to the first embodiment of the present invention.

As shown in FIG. 1 and FIG. 2, the cushion airbag 22 is expanded and deployed in a substantial U-shape that opens rearward as seen in plan view. Specifically, the cushion airbag 22 in an expanded and deployed state is configured to have a right chamber 22R and a left chamber 22L serving as first and second expanding portions and a front chamber 22F serving as a third expanding portion that communicates the front ends of the right chamber 22R and the left chamber 22L with one another. The right chamber 22R is disposed on the right side with respect to a seat width direction (vehicle width direction) centerline CL of the seat cushion 14 and is deployed from the front end portion to the rear portion of the seat cushion 14. The left chamber 22L is disposed on the left side with respect to the centerline CL and is deployed from the front end portion to the rear portion of the seat cushion 14. The front chamber 22F cuts across the centerline CL and communicates the right chamber 22R and the left chamber 22L with one another.

The right chamber 22R and the left chamber 22L have a configuration wherein they oppose one another in the seat width direction across a central space portion 22C positioned on the centerline CL in the expanded and deployed state. That is, the right chamber 22R, the left chamber 22L, and the front chamber 22F are disposed in such a way as to form (surround) the central space portion 22C. For this reason, the cushion airbag 22 corresponds to a U-shaped airbag of the present invention. The cushion airbag 22 is not folded up or is appropriately folded up and disposed on the seat pan 14A. In this embodiment, the cushion airbag 22 has a substantial U-shape that opens rearward as seen in plan view before being expanded and deployed.

Figure 5:
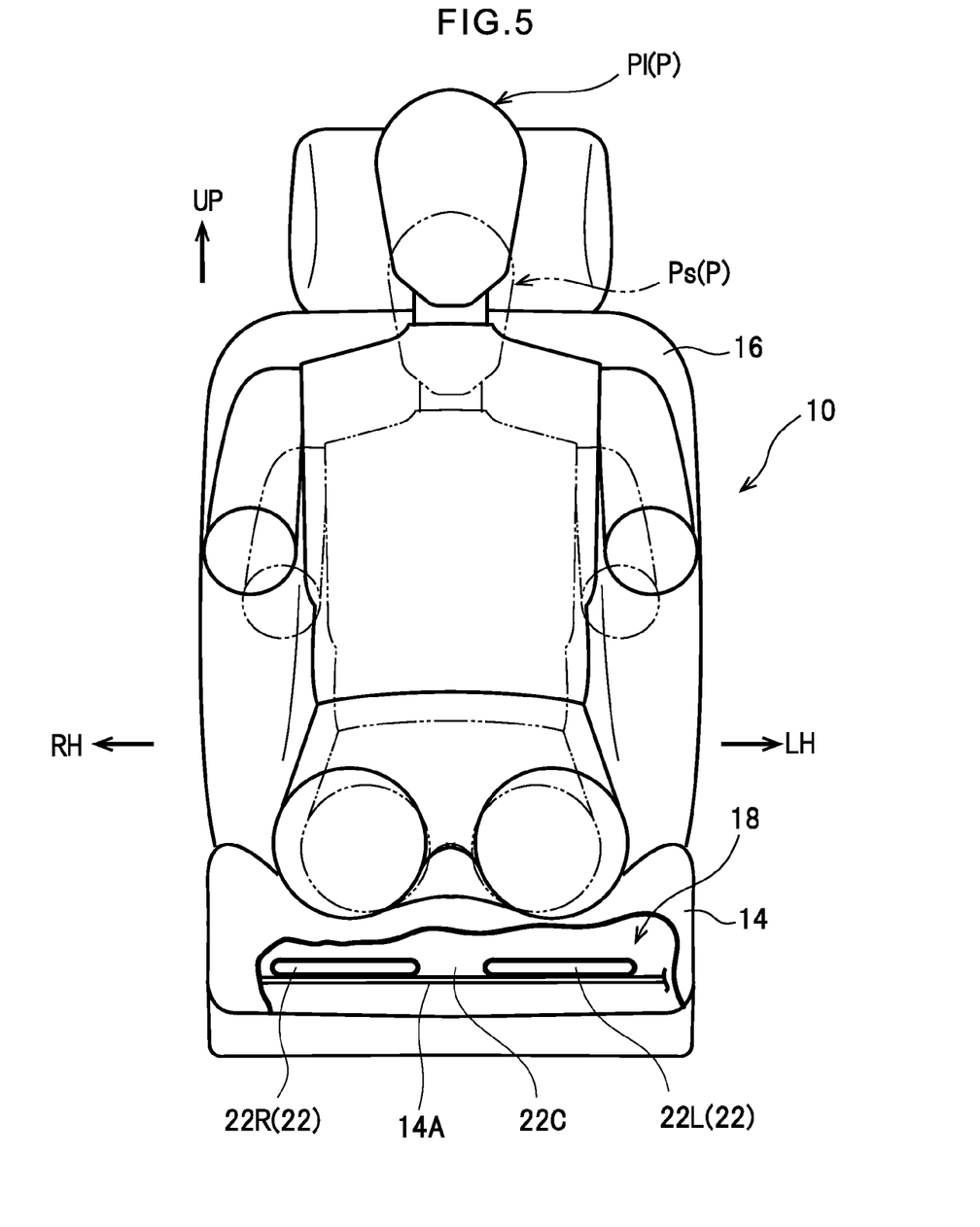
FIG. 5 is a partial cutaway front view comparatively showing seated positions of a small occupant and a large occupant seated on the vehicular seat relating to the first embodiment of the present invention.

As shown in FIG. 5, the right chamber 22R of the cushion airbag 22 is disposed under the right thigh of the seated occupant P and the left chamber 22L is disposed under the left thigh of the seated occupant P. In this embodiment, the placement of the left and right chambers 22L and 22R (the distance between them in the vehicle width direction) is decided in such a way that the left and right chambers 22L and 22R are positioned both under the left and right thighs of a large seated occupant Pl and under the left and right thighs of a small seated occupant Ps. It is known that the thighs of the small seated occupant Ps are positioned in such a way as to coincide with the seat width direction inner side sections of the thighs of the large seated occupant Pl. Consequently, the left and right chambers 22L and 22R have a dimension and shape wherein they project outward in the seat width direction with respect to the left and right thighs of the small seated occupant Ps.

Figure 6A:
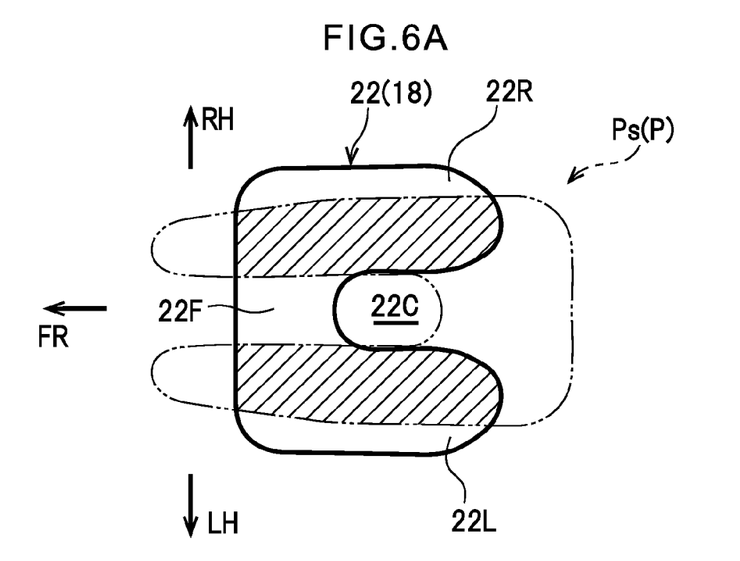
FIG. 6A is a plan view schematically showing the range of contact between the small occupant and the cushion airbag configuring the vehicular seat relating to the first embodiment of the present invention.
Figure 6B:
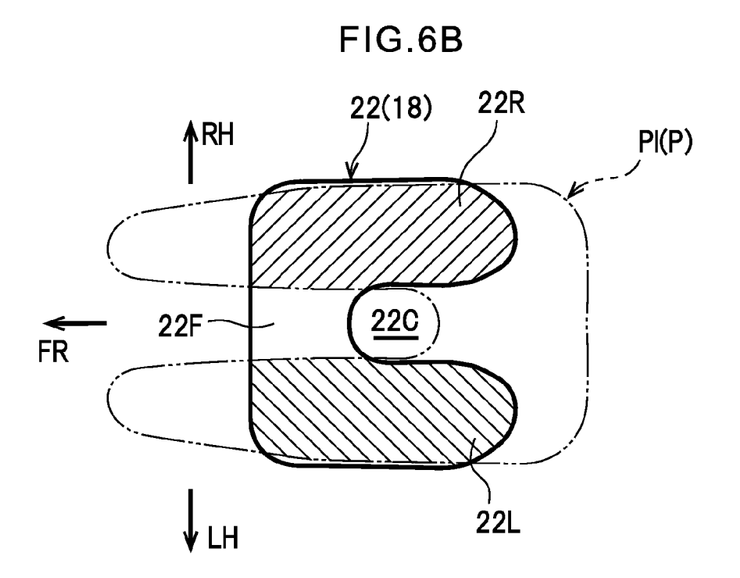
FIG. 6B is a plan view schematically showing the range of contact between the large occupant and the cushion airbag configuring the vehicular seat relating to the first embodiment of the present invention.

More specifically, the hatched sections of the cushion airbag 22 shown in FIG. 6A are the sections where the cushion airbag 22 contacts the small seated occupant Ps as seen in plan view. Furthermore, the hatched sections of the cushion airbag 22 shown in FIG. 6B are the sections where the cushion airbag 22 contacts the large seated occupant Pl as seen in plan view. The cushion airbag 22 has a configuration wherein the area of contact with the large seated occupant Pl is larger than the area of contact with the small seated occupant Ps and the cushion airbag 22 can generate a relatively large reaction force with respect to the large seated occupant Pl. In other words, the cushion airbag 22 has a configuration wherein the area of contact with the small seated occupant Ps is smaller than the area of contact with the large seated occupant Pl and the cushion airbag 22 can generate a relatively small reaction force with respect to the small seated occupant Ps.

The cushion airbag 22 is fixed, at its front chamber 22F, to the seat pan 14A via the inflator 20 disposed in the interior of the front chamber 22F. The inflator 20 has a tubular shape (in the present embodiment, a substantially cylindrical shape) that is long in the seat width direction, and the inflator 20 is fixed to the seat pan 14A in plural positions in its lengthwise direction. Gas discharge holes 20A are formed in a lengthwise direction end portion of the inflator 20.

Consequently, the inflator 20 has a configuration wherein it discharges gas from the gas discharge holes 20A when it is actuated. In this embodiment, plural gas discharge holes 20A are formed along the circumferential direction of the inflator 20. These gas discharge holes 20A are disposed on the vehicle width direction outer side with respect to the vehicle width direction centerline CL of the cushion airbag 22. The gas discharge holes 20A may also be formed on both lengthwise direction end sides of the inflator 20.

The cushion airbag device 18 is electrically connected to a non-illustrated airbag ECU serving as a control device. The airbag ECU has a configuration wherein it actuates the inflator 20 in a case where it has detected (the inevitability of) a frontal impact of the vehicle on the basis of a signal from a non-illustrated frontal impact sensor.

Furthermore, as shown in FIG. 3 and FIG. 4, a seat belt device 26 for restraining the seated occupant P with webbing 26A at the time of a frontal impact is disposed on the vehicular seat 10. In this embodiment, a 3-point seat belt device 26 is disposed on the vehicular seat 10. Moreover, a frontal impact airbag device 30 for restraining forward movement of mainly the upper body of the seated occupant P at the time of a frontal impact is disposed in an instrument panel 28 (or a steering wheel) in front of the vehicular seat 10. In FIG. 4, a deployed state of a frontal impact airbag 30A for a front passenger's seat deployed from the instrument panel 28 is shown.

Next, the action of the present embodiment will be described.

In the vehicular seat 10 with the above configuration, when a frontal impact of the vehicle is detected, the inflator 20 of the cushion airbag device 18 is actuated. Then, the cushion airbag 22 that has received the supply of gas from the inflator 20 is expanded and deployed in the seat cushion 14 and raises the thighs of the seated occupant P. Because of this, forward movement of mainly the legs of the seated occupant P caused by inertia is suppressed, and the seated occupant P is protected from a collision with the instrument panel or the like. Specifically, diving of the seated occupant P wearing the 3-point seat belt device 26 into the seat cushion 14 (the so-called submarine phenomenon) is suppressed by the cushion airbag 22, whereby forward movement of the seated occupant P is restrained well by the 3-point seat belt device. The cushion airbag device 18 is effective particularly in the case of an automobile employing a thin instrument panel 28 that is flat in the up and down direction, because with a knee airbag it is difficult for the reaction force from the knees of the occupant to be supported by the instrument panel 28.

Here, the cushion airbag 22 has a substantial U-shape that surrounds the central space portion 22C as seen in plan view, so the capacity of the cushion airbag 22 is smaller compared to that of a cushion airbag of a comparative example that is circular or rectangular as seen in plan view and in which the central space portion 22C is not formed. For this reason, compared to the comparative example, the expansion and deployment of the cushion airbag 22 is completed in a shorter amount of time using the same inflator 20. Consequently, the cushion airbag device 18—that is, the vehicular seat 10—equipped with the cushion airbag 22 can effectively suppress forward movement of the seated occupant P in a short amount of time from the detection of a frontal impact. That is, compared to the comparative example, initial restraint performance at the time of a frontal impact is improved.

Furthermore, the cushion airbag 22 is fixed to the seat pan 14A via the inflator 20 disposed in the front chamber 22F. For this reason, the cushion airbag 22 is limited from moving forward when suppressing forward movement of the seated occupant P. More specifically, the cushion airbag 22 is effectively suppressed from collapsing forward in accompaniment with the forward movement of the seated occupant P and becoming positionally displaced with respect to the seat cushion 14. Because of this, the initial restraint performance resulting from the cushion airbag 22 at the time of a frontal impact is improved even more.

Additionally, the right chamber 22R and the left chamber 22L of the cushion airbag 22 are expanded and deployed under the thighs of the large seated occupant Pl and the small seated occupant Ps, so excellent initial restraint performance is obtained regardless of the build of the seated occupant. That is, the positions of the thighs of the seated occupant P in the seated state on the seat cushion 14 are substantially shared in common (include common portions) from adults to children, so excellent initial restraint performance is obtained from adults to children with the cushion airbag 22 that has a substantial U-shape as seen in plan view. In other words, the capacity of the cushion airbag 22 can be made smaller than in the comparative example as described above while ensuring initial restraint performance corresponding to build.

Moreover, the cushion airbag 22 is formed in a substantial U-shape that opens rearward, so the cushion airbag 22 does not have a section contacting the buttocks of the seated occupant P, or if it does, the section is small. For this reason, differences (percentages) in the area of contact between the cushion airbag 22 and the seated occupant P resulting from differences in the build of the seated occupant P are larger compared to a cushion airbag that is circular or rectangular as seen in plan view. Because of this, for example, with respect to the small seated occupant Ps, forward movement of the seated occupant P can be suppressed while keeping the reaction force accompanying the expansion and deployment of the cushion airbag 22 small in a small area of contact. That is, the inertial force acting on the small seated occupant Ps at the time of a frontal impact is small, so the small seated occupant Ps can be appropriately protected (restrained) with a small reaction force. And with respect to the large seated occupant Pl, a sufficient reaction force that can counter the large inertial force can be generated in a large area of contact, and forward movement of the large seated occupant Pl can be effectively suppressed.

Furthermore, the cushion airbag 22 is configured to have the front chamber 22F, so the gas can be supplied to the left and right chambers 22L and 22R with a simple configuration. That is, a configuration can be provided in which the gas can be supplied in a short amount of time to the left and right chambers 22L and 22R with a simple configuration wherein the inflator 20 shared in common by the left and right chambers 22L and 22R is disposed in the front chamber 22F interconnecting the left and right chambers 22L and 22R.

Other Embodiments

Next, other embodiments of the present invention will be described. Regarding configurations that are basically the same as the configurations of the first embodiment or previous configurations, reference signs identical to those of the configurations of the first embodiment or previous configurations will be assigned thereto and sometimes description and illustration thereof will be omitted.

Second Embodiment

Figure 7:
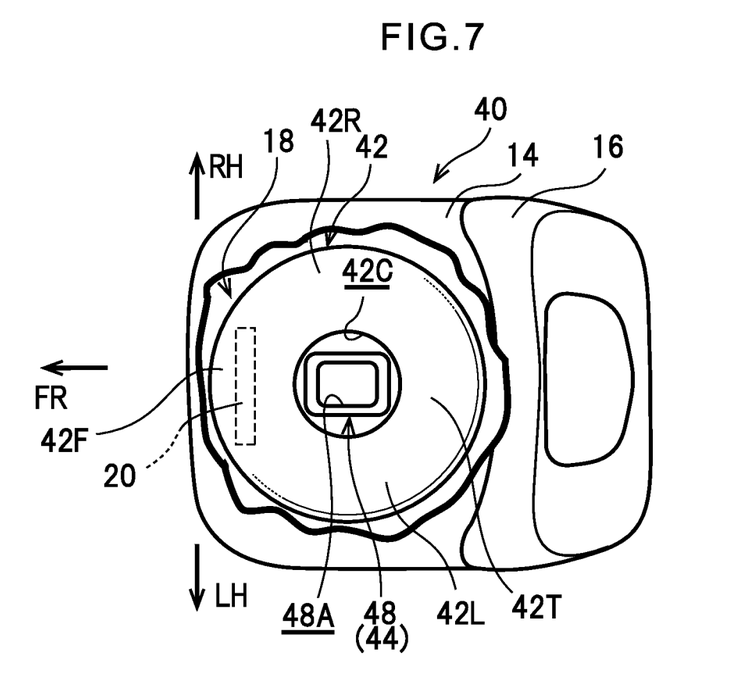
FIG. 7 is a partial cutaway plan view showing a vehicular seat relating to a second embodiment of the present invention.

In FIG. 7, a vehicular seat 40 relating to a second embodiment is shown by way of a partial cutaway plan sectional view. As shown in this drawing, the vehicular seat 40 differs from the vehicular seat 10 relating to the first embodiment in that it has a cushion airbag 42 that has an annular shape (a doughnut shape) instead of the cushion airbag 22 that is substantially U-shaped as seen in plan view.

Specifically, in the cushion airbag 42 in an expanded and deployed state, front and rear ends of a right chamber 42R and a left chamber 42L that oppose one another in the seat width direction across a central space portion 42C are communicated with one another by a front chamber 42F and a rear chamber 42T. In other words, the right chamber 42R, the left chamber 42L, the front chamber 42F, and the rear chamber 42T are disposed in such a way as to form (surround) the central space portion 42C positioned on the centerline CL. In this embodiment, the cushion airbag 42 is expanded and deployed in an annular shape overall as seen in plan view. For this reason, the cushion airbag 42 corresponds to an annular airbag of the present invention. The cushion airbag 42 is not folded up or is appropriately folded up and disposed on the seat pan 14A. In this embodiment, the cushion airbag 22 has an annular shape as seen in plan view before being expanded and deployed.

Figure 8:
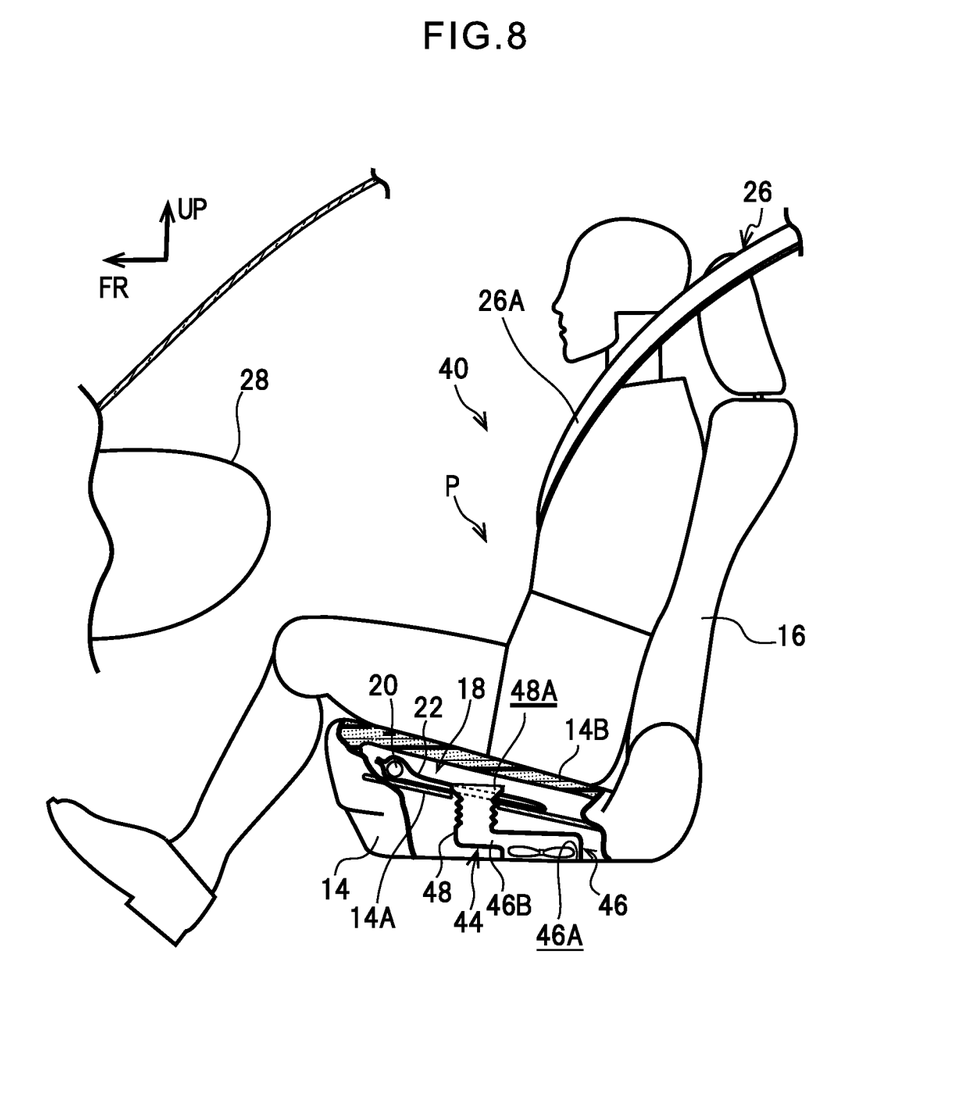
FIG. 8 is a partial cutaway side view showing the vehicular seat relating to the second embodiment of the present invention.

Furthermore, as shown in FIG. 8, a seat cooling device 44 serving as seat cooling device is disposed in the seat cushion 14 configuring the vehicular seat 40. The seat cooling device 44 is configured to comprise a seat fan unit 46 that sucks in cabin air from a lower air inlet 46A and blows out the air from an air outlet 46B. Furthermore, the seat cooling device 44 is configured to comprise a duct 48 that guides the air blown out by the seat fan unit 46 toward the undersurface side of the cushion material 14B. The seat fan unit 46 is fixed to the seat pan 14A of the seat cushion 14 via a non-illustrated bracket.

Additionally, as shown in FIG. 7, the duct 48 penetrates the seat pan 14A from below, and an open portion 48A on the downstream end of the duct 48 opens to the central space portion 42C as seen in plan view. Because of this, the vehicular seat 40 has a configuration wherein the air blown out from the open portion 48A of the duct 48 is not obstructed by the cushion airbag 42. The air blown out from the open portion 48A is blown out above the seat cushion 14 through the air-permeable cushion material 14B (and cover material). Other configurations of the vehicular seat 40 are the same as the corresponding configurations of the vehicular seat 10, including non-illustrated sections.

Consequently, with the vehicular seat 40 relating to the second embodiment also, although it is slightly inferior to the vehicular seat 10 in terms of obtaining an appropriate protective configuration corresponding to differences in the build of the seated occupant P, basically the same effects can be obtained with the same action as that of the vehicular seat 10 relating to the first embodiment. Furthermore, the vehicular seat 40 has a configuration wherein the open portion 48A of the duct 48 opens to the central space portion 42C of the seat cushion 42, so the cushion airbag device 18 and the seat cooling device 44 can both be disposed in the seat cushion 14. That is, a balance between the safety and comfort of the seated occupant P is achieved.

Third Embodiment

Figure 9:
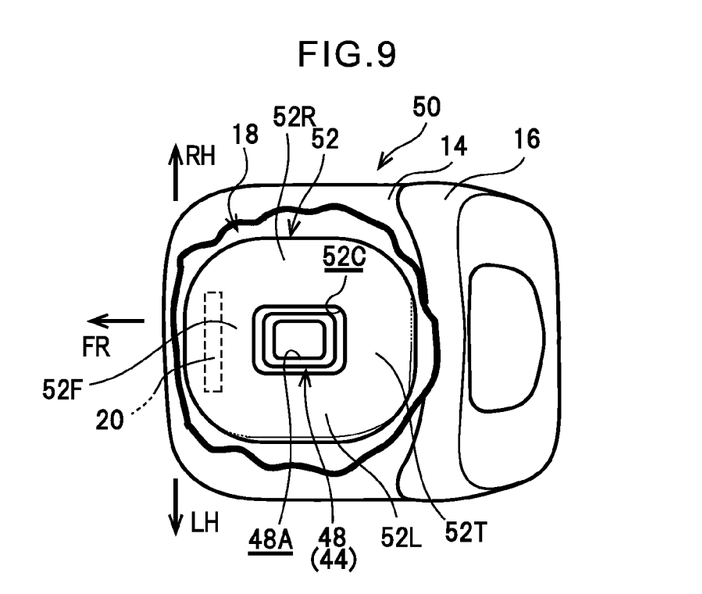
FIG. 9 is a partial cutaway plan view showing a vehicular seat relating to a third embodiment of the present invention.

In FIG. 9, a vehicular seat 50 relating to a third embodiment is shown by way of a partial cutaway plan view. As shown in this drawing, the vehicular seat 50 differs from the vehicular seat 40 relating to the second embodiment in that it has a cushion airbag 52 that has a substantially rectangularly annular shape (an elliptically annular shape) instead of the cushion airbag 42 that has a substantially annular shape as seen in plan view.

Specifically, in the cushion airbag 52 in an expanded and deployed state, front and rear ends of a right chamber 52R and a left chamber 52L that oppose one another in the seat width direction across a central space portion 52C are communicated with one another by a front chamber 52F and a rear chamber 52T. In other words, the right chamber 52R, the left chamber 52L, the front chamber 52F, and the rear chamber 52T are disposed in such a way as to form (surround) the central space portion 52C positioned on the centerline CL. In this embodiment, the right chamber 52R and the left chamber 52L are formed in straight lines that are long in the front and rear direction.

The cushion airbag 52 is expanded and deployed in a substantially rectangularly annular shape overall as seen in plan view. For this reason, the cushion airbag 52 corresponds to an annular airbag of the present invention. The cushion airbag 52 is not folded up or is appropriately folded up and disposed on the seat pan 14A. In this embodiment, the cushion airbag 52 has an annular shape as seen in plan view before being expanded and deployed. Other configurations of the vehicular seat 50 are the same as the corresponding configurations of the vehicular seat 40, including non-illustrated sections.

Consequently, with the vehicular seat 50 relating to the third embodiment also, basically the same effects can be obtained with the same action as that of the vehicular seat 40 relating to the second embodiment (the vehicular seat 10). Furthermore, in the vehicular seat 50, the seat cushion 52 has a substantially rectangularly annular shape, so it is suitably applied to a vehicular seat equipped with a relatively large seat cushion 14.

Fourth Embodiment

Figure 10:
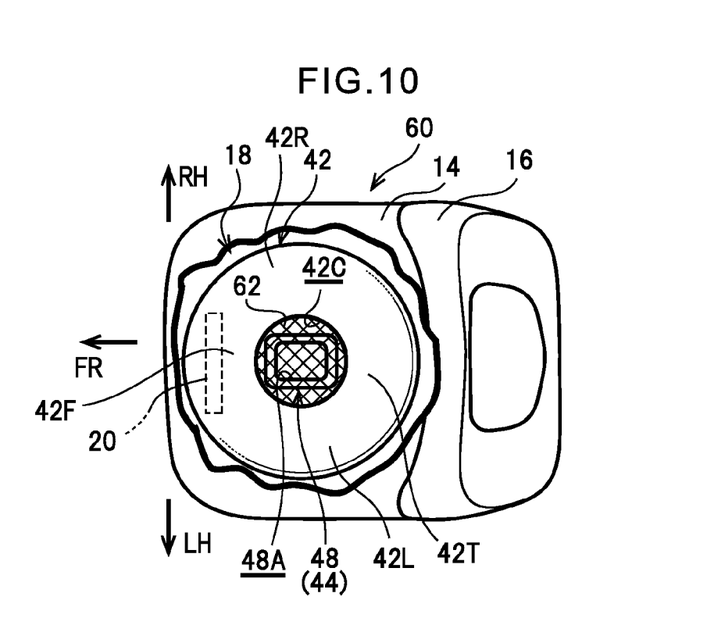
FIG. 10 is a partial cutaway plan view showing a vehicular seat relating to a fourth embodiment of the present invention.

In FIG. 10, a vehicular seat 60 relating to a fourth embodiment is shown by way of a partial cutaway plan view. As shown in this drawing, the vehicular seat 60 differs from the vehicular seat 40 relating to the second embodiment in that it is disposed with a mesh cloth 62 serving as a joint cloth that covers the central space portion 42C of the cushion airbag 42 that is substantially annular as seen in plan view.

Specifically, the mesh cloth 62 comprises a mesh base cloth and is air-permeable. For this reason, the mesh cloth 62 has a configuration wherein the air from the seat cooling device 44 is steered through the mesh cloth 62 to the cushion material 14B. The mesh cloth 62 is joined by sewing it, for example, to the right chamber 42R, the left chamber 42L, the front chamber 42F, and the rear chamber 42T configuring the cushion airbag 42. In this embodiment, the mesh cloth 62, which is formed in a substantially circular shape as seen in plan view, is joined by sewing it to the inner edge portion of the cushion airbag 42 around its entire circumference.

Figure 11:
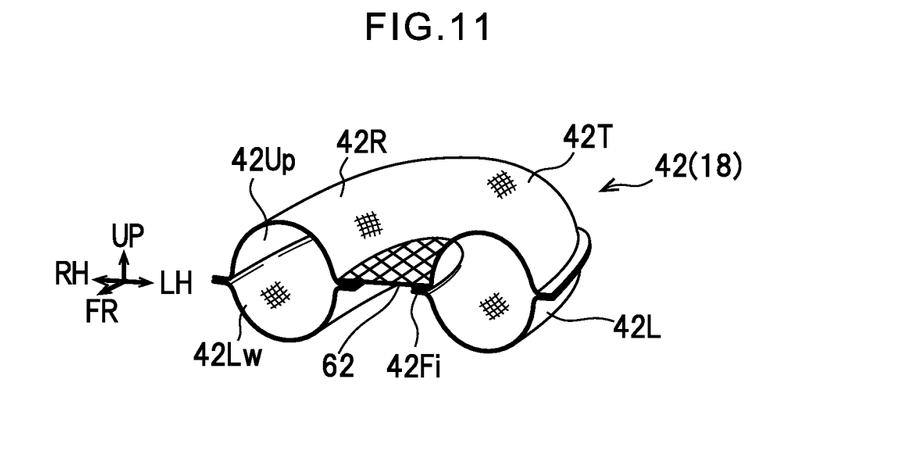
FIG. 11 is a perspective view in which a cushion airbag configuring the vehicular seat relating to the fourth embodiment of the present invention is shown halved.

More specifically, as shown in FIG. 11, in which the cushion airbag 42 is halved, the cushion airbag 42 is formed by joining a pair of upper and lower base cloths 42Up and 42Lw. The mesh cloth 62 is joined by sewing it around its entire circumference to an inner peripheral flange portion 42Fi that is the joint section of the upper and lower base cloths 42Up and 42Lw. Other configurations of the vehicular seat 60 are the same as the corresponding configurations of the vehicular seat 40, including non-illustrated sections.

Consequently, with the vehicular seat 60 relating to the fourth embodiment also, basically the same effects can be obtained with the same action as that of the vehicular seat 40 relating to the second embodiment (the vehicular seat 10). Furthermore, in the vehicular seat 60, the right chamber 42R, the left chamber 42L, the front chamber 42F, and the rear chamber 42T are suppressed by the (tension of the) mesh cloth 62 from moving away from one another when the occupant is protected (restrained) by the cushion airbag 42 in a frontal impact. That is, the cushion airbag 42 is reinforced by the mesh cloth 62. Because of this, forward collapse of the cushion airbag 42 accompanying forward movement of the seated occupant P and an increase in the amount of forward movement of the seated occupant P caused thereby are effectively suppressed. An increase in the amount of forward movement of the seated occupant P is more effectively suppressed particularly in combination with the structure wherein the front chamber 42F is fixed to the seat pan 14A via the inflator 20.

An example was described where the vehicular seat 60 relating to the fourth embodiment was equipped with the mesh cloth 62, but the mesh cloth 62 may also be disposed in the cushion airbags 22 and 52 relating to the first and third embodiments. Furthermore, examples were described where the vehicular seats 40, 50, and 60 relating to the second to fourth embodiments were equipped with the seat cooling device 44, but in the first embodiment, for example, the seat cooling device 44 may also be disposed in such a way that the open portion 48A of the duct 48 faces the central space portion 22C. In a configuration where the vehicular seat is not equipped with the seat cooling device 44 but is disposed with a joint cloth, the vehicular seat may also have a configuration wherein the joint cloth is not air-permeable.

Furthermore, in each of the embodiments described above, examples were described where the vehicular seats 10, 40, 50, and 60 are front passenger's seats, but the present invention is not limited to this. The vehicular seats 10, 40, and 50 may also be driver's seats or seats from the second row on in a vehicle having plural rows of seats.

Moreover, in each of the embodiments described above, examples were described where the right chambers 22R, 42R, and 52R and the left chambers 22L, 42L, and 52L were communicated with one another by the front chambers 22F, 42F, and 52F and so forth, but the present invention is not limited to this. For example, the vehicular seat may also have a configuration wherein the gas is supplied independently to chambers that are right and left independent bag bodies or a configuration wherein the gas is supplied from an inflator (diffuser) shared in common by chambers (first and second expanding portions) that are right and left independent bag bodies. Furthermore, for example, the vehicular seat may also have a configuration equipped with a communicating chamber (third expanding portion) that communicates left and right chambers (first and second expanding portions) at sections other than their front ends (only their rear end sides, etc.).

Moreover, in each of the embodiments described above, examples were described where the occupant P seated in the vehicular seats 10, 40, and 50 is protected by the cushion airbag devices 18, 42, and 52, the 3-point seat belt device 26, and the frontal impact airbag device 30, but the present invention is not limited to this. For example, the present invention may also be applied to a vehicular seat equipped with an occupant protection device instead of the 3-point seat belt device 26. Such an occupant protection device is configured, for example, by installing, in a lap bar disposed in the vehicle width direction in front of and in non-contact with the abdomen of the seated occupant P, a lap belt worn around the waist of the occupant and an airbag that deploys between the upper body of the occupant and the instrument panel at the time of a frontal impact.

In addition, the present invention can be altered in various ways and implemented without departing from the gist thereof.

The invention claimed is:

1. A vehicular seat for use with a seated occupant in a vehicle, the vehicular seat comprising:
   a seat cushion;
   a first expanding portion that is provided in the seat cushion on one side of the seat cushion with respect to a seat width direction center and configured to expand and deploy in response to receiving a supply of gas, the first expanding portion being configured to be disposed under the right thigh of the seated occupant;
   a second expanding portion that is provided in the seat cushion on the other side thereof with respect to the seat width direction center and configured to expand and deploy in response to receiving the supply of gas, the second expanding portion opposing the first expanding portion across a central space portion in the seat width direction when expanding and deploying, the second expanding portion being configured to be disposed under the left thigh of the seated occupant; and
   a gas supplying device configured to, when actuated in response to a frontal impact of the vehicle, supply gas to the first expanding portion and the second expanding portion;
   a third expanding portion configured to allow fluid communication between the first expanding portion and the second expanding portion; and
   an annular airbag that has an annular shape that surrounds the central space portion as seen in plan view, a portion of the annular airbag being formed of the first, second and third expanding portions.

2. The vehicular seat of claim 1, further comprising:
   a joint cloth that is provided in the seat cushion in such a way as to cover the central space portion and that is joined to the first, second and third expanding portions.

3. The vehicular seat of claim 2, further comprising:
a duct that is disposed facing the central space portion, forms at least part of a seat cooling device, and blows out air in the seat cushion, wherein the joint cloth is air-permeable.

4. The vehicular seat of claim 3, wherein the gas supplying device is disposed in the third expanding portion and fixes the third expanding portion to the seat cushion.

5. The vehicular seat of claim 2, wherein the gas supplying device is disposed in the third expanding portion and fixes the third expanding portion to the seat cushion.

6. The vehicular seat of claim 1, further comprising:
a duct that is disposed facing the central space portion, forms at least part of a seat cooling device, and blows out air in the seat cushion.

7. The vehicular seat of claim 6, wherein the gas supplying device is disposed in the third expanding portion and fixes the third expanding portion to the seat cushion.

8. The vehicular seat of claim 1, wherein the gas supplying device is disposed in the third expanding portion and fixes the third expanding portion to the seat cushion.

9. A vehicular seat for use with a seated occupant in a vehicle, the vehicular seat comprising:
a seat cushion;
a first expanding portion that is provided in the seat cushion on one side of the seat cushion with respect to a seat width direction center and configured to expand and deploy in response to receiving a supply of gas, the first expanding portion being configured to be disposed under the right thigh of the seated occupant;
a second expanding portion that is provided in the seat cushion on the other side of the seat cushion with respect to the seat width direction center and configured to expand and deploy in response to receiving the supply of gas, the second expanding portion opposing the first expanding portion across a central space portion in the seat width direction when expanding and deploying, the second expanding portion being configured to be disposed under the left thigh of the seated occupant;
a gas supplying device configured to, when actuated at the time of a frontal impact of the vehicle, supply gas to the first expanding portion and the second expanding portion;
a third expanding portion configured to allow fluid communication between the first expanding portion and the second expanding portion;
a joint cloth that is: (i) provided in the seat cushion, and configured to cover the central space portion, (ii) joined to the first to third expanding portions, and (iii) air-permeable; and
a duct that is disposed facing the central space portion, forms at least part of a seat cooling device, and blows out air in the seat cushion, wherein:
the first to third expanding portions form part of an annular airbag having an annular shape that surrounds the central space portion as seen in plan view.

10. The vehicular seat according to claim 9, wherein the first to third expanding portions form a U-shape that opens rearward in a seat front and rear direction as seen in plan view and that surrounds the central space portion.

11. The vehicular seat of claim 10, wherein the gas supplying device is disposed in the third expanding portion and fixes the third expanding portion to the seat cushion.

12. The vehicular seat of claim 9, wherein the gas supplying device is disposed in the third expanding portion and fixes the third expanding portion to the seat cushion.

* * * * *